US012652337B2

(12) United States Patent      (10) Patent No.: US 12,652,337 B2
 Tanaka                            (45) Date of Patent:        Jun. 9, 2026

(54) COMMUNICATION SYSTEM, CONTROLLER, SERVER DEVICE AND METHOD

(71) Applicant: KABUSHIKI KAISHA TOSHIBA, Tokyo (JP)

(72) Inventor: Yasuyuki Tanaka, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 265 days.

(21) Appl. No.: 18/586,654

(22) Filed: Feb. 26, 2024

(65) Prior Publication Data

US 2025/0055919 A1      Feb. 13, 2025

(30) Foreign Application Priority Data

Aug. 7, 2023      (JP) ................................. 2023-128589

(51) Int. Cl.
 *H04L 67/141*            (2022.01)

(52) U.S. Cl.
 CPC ................................. *H04L 67/141* (2013.01)

(58) Field of Classification Search
 CPC ....... H04L 67/141; G06F 21/00; G06F 21/70; G06F 21/73; G06F 21/81; G06F 21/82;
 (Continued)

(56) References Cited

U.S. PATENT DOCUMENTS 8,073,939 B2 * 12/2011 Yamamoto ............ H04L 63/102
                                                    709/227
8,763,101 B2 *  6/2014 Counterman ......... H04W 84/12
                                                    713/168
(Continued)

FOREIGN PATENT DOCUMENTS

JP          2006-303758 A      11/2006
JP          2016-192706 A      11/2016
                 (Continued)

OTHER PUBLICATIONS

G. P. Liu, "Predictive Controller Design of Networked Systems With Communication Delays and Data Loss," in IEEE Transactions on Circuits and Systems II: Express Briefs, vol. 57, No. 6, pp. 481-485, Jun. 2010. (Year: 2010).*

(Continued)

*Primary Examiner* — Melvin H Pollack
(74) *Attorney, Agent, or Firm* — Oblon, McClelland, Maier & Neustadt, L.L.P.

(57)                    ABSTRACT

According to one embodiment, a communication system includes a controller provided in an edge device and a server device connected, via a network, to a communication device connected to the controller. The server device includes a first processor configured to receive first information unique to the controller and second information unique to the communication device, and determine whether the communication device is connectible to the controller based on the first and second information. The controller includes a second processor configured to receive connection availability information including a result of the determination from the server device, and reject connection of the communication device based on the connection availability information.

12 Claims, 11 Drawing Sheets

(58) Field of Classification Search

CPC ........ G06F 21/85; G16Y 30/10; G16Y 40/30; G16Y 40/35; G16Y 40/50

USPC ......................................................... 709/227

See application file for complete search history.

(56) References Cited

U.S. PATENT DOCUMENTS

| | | | | |
|---|---|---|---|---|
| 9,681,476 | B2 * | 6/2017 | Qi | H04W 76/18 |
| 10,873,576 | B2 * | 12/2020 | Edwards | H04L 63/0861 |
| 10,904,829 | B2 * | 1/2021 | Kneckt | H04W 52/0216 |
| 11,373,762 | B2 * | 6/2022 | Futamura | G16Y 30/10 |
| 11,613,009 | B2 * | 3/2023 | Savini | B25J 9/163 |
| | | | | 700/213 |
| 12,020,690 | B1 * | 6/2024 | Gamzu | G06N 3/045 |
| 12,081,289 | B2 * | 9/2024 | Choi | H02J 50/12 |
| 12,132,609 | B2 * | 10/2024 | Smith | H04W 4/70 |
| 12,210,745 | B2 * | 1/2025 | Levy | G06F 13/42 |
| 12,381,753 | B2 * | 8/2025 | Yoo | H04L 12/2807 |
| 12,402,001 | B2 * | 8/2025 | Lee | H04W 4/80 |
| 12,513,006 | B1 * | 12/2025 | Morrissey | H04L 9/3268 |
| 2019/0053139 | A1 * | 2/2019 | Basu Mallick | H04W 76/27 |
| 2022/0407843 | A1 | 12/2022 | Tanaka et al. | |
| 2024/0195795 | A1 * | 6/2024 | Evans | H04L 9/3268 |
| 2024/0314058 | A1 * | 9/2024 | Mueck | H04L 41/40 |
| 2024/0406004 | A1 * | 12/2024 | Sun | H04L 9/3247 |
| 2025/0175797 | A1 * | 5/2025 | Baskaran | H04W 12/082 |
| 2025/0220616 | A1 * | 7/2025 | Velev | H04W 48/18 |

FOREIGN PATENT DOCUMENTS

| | | | | | |
|---|---|---|---|---|---|
| JP | | 7100916 | B2 | 7/2022 | |
| JP | | 2022-191825 | A | 12/2022 | |
| JP | | WO 2023/286308 | A1 | 1/2023 | |
| WO | | WO-2023135779 | A1 * | 7/2023 | ....... G08G 1/096791 |
| WO | | WO-2024138592 | A1 * | 7/2024 | ............. H04L 67/02 |

OTHER PUBLICATIONS

A. W. Al-Dabbagh, "Design of a Wireless Control System With Unreliable Nodes and Communication Links, " in IEEE Transactions on Cybernetics, vol. 49, No. 1, pp. 315-327, Jan. 2019. (Year: 2019).*

Brandon Heller, Rob Sherwood, and Nick McKeown. 2012. The controller placement problem. SIGCOMM Comput. Commun. Rev. 42, 4 (Oct. 2012), 473-478. (Year: 2012).*

Kevin Fall. 2003. A delay-tolerant network architecture for challenged internets. In Proceedings of the 2003 conference on Applications, technologies, architectures, and protocols for computer communications (SIGCOMM '03). Association for Computing Machinery, New York, NY, USA, 27-34. (Year: 2003).*

Feng-Li Lian, J. R. Moyne and D. M. Tilbury, "Performance evaluation of control networks: Ethernet, ControlNet, and DeviceNet," in IEEE Control Systems Magazine, vol. 21, No. 1, pp. 66-83, Feb. 2001 (Year: 2001).*

"AOSS expands the future of wireless home networks", Buffalo Inc., 2019, 4 pages (with Machine Generated English Translation), https: //www buffalo ip/top ize/detail/aoss.html.

Japanese Office Action dated Dec. 16, 2025, issued in Japanese Patent Application No. 2023-128589 (with English translation; Documents 19-21 being cited therein).

* cited by examiner

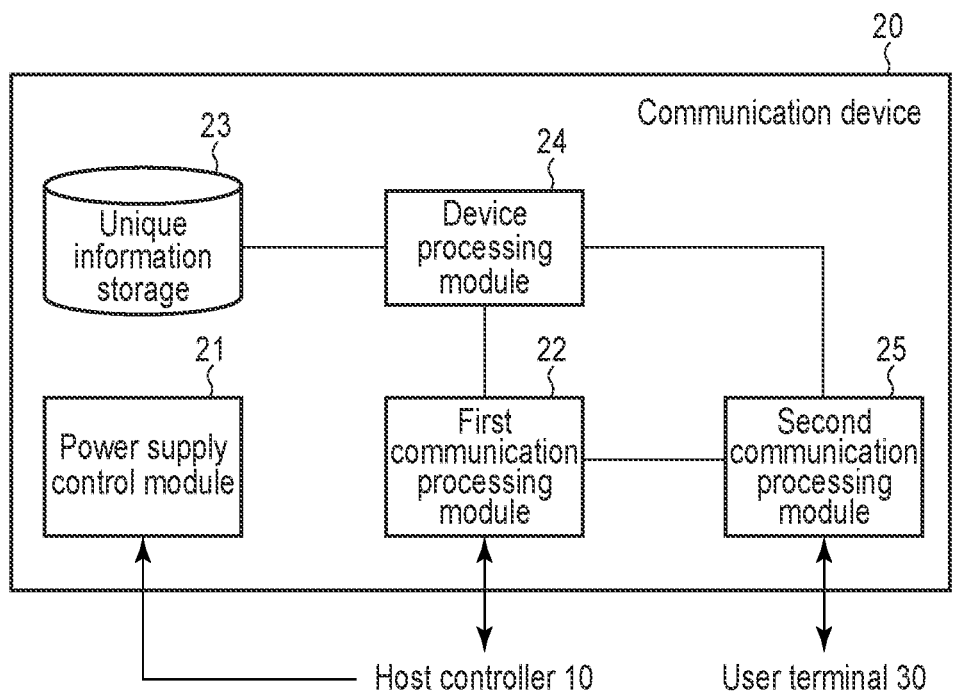
F I G. 3
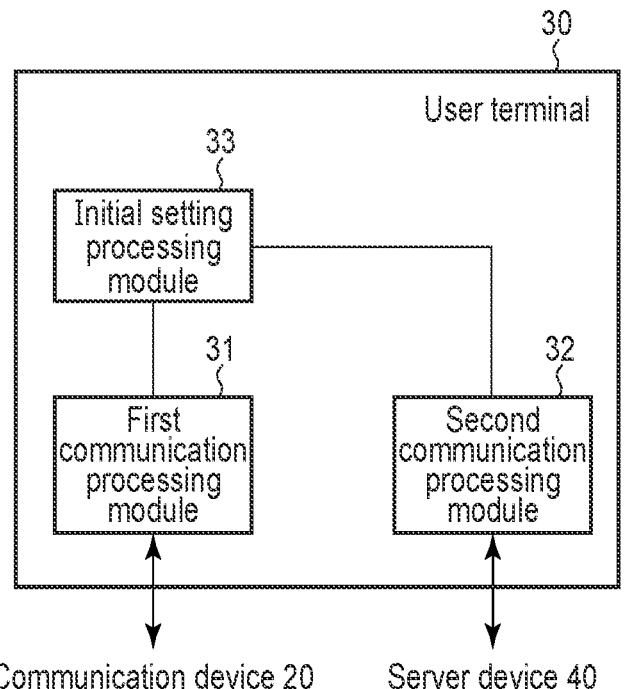
F I G. 4

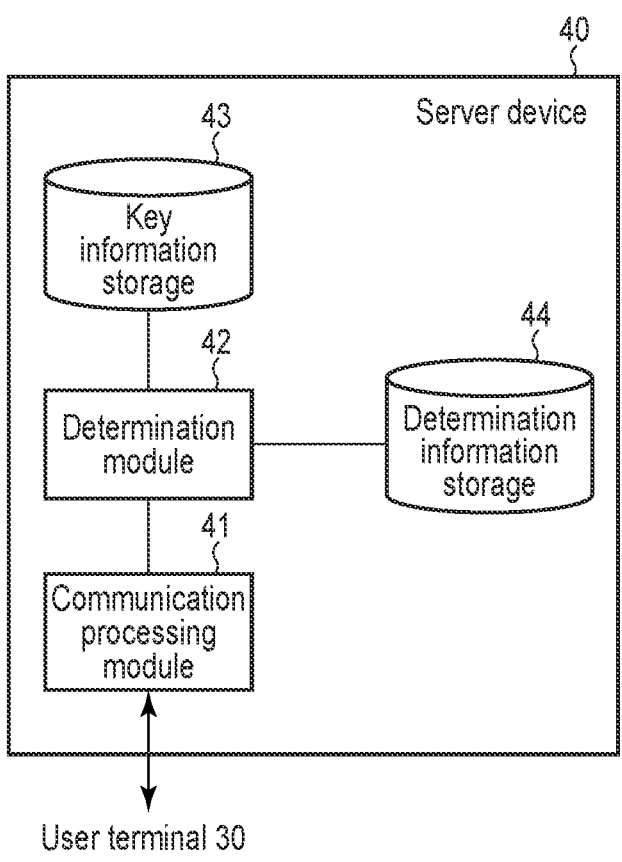
F I G. 5
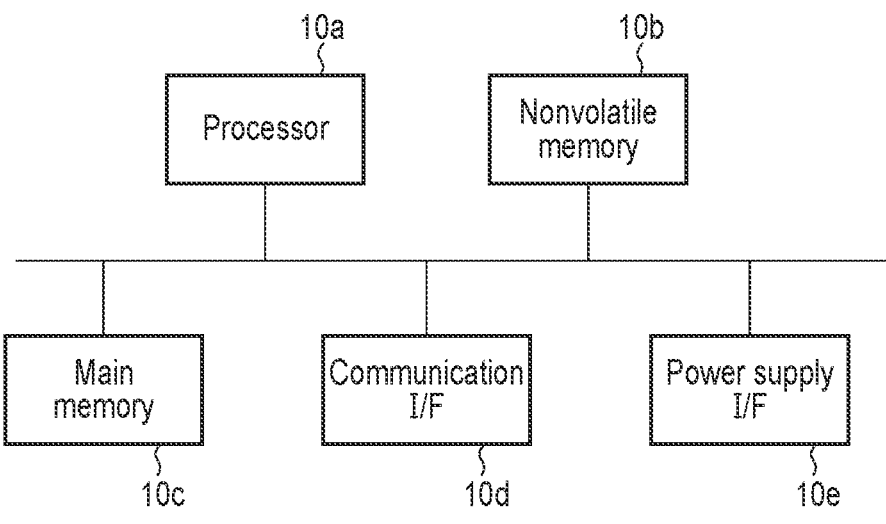
F I G. 6

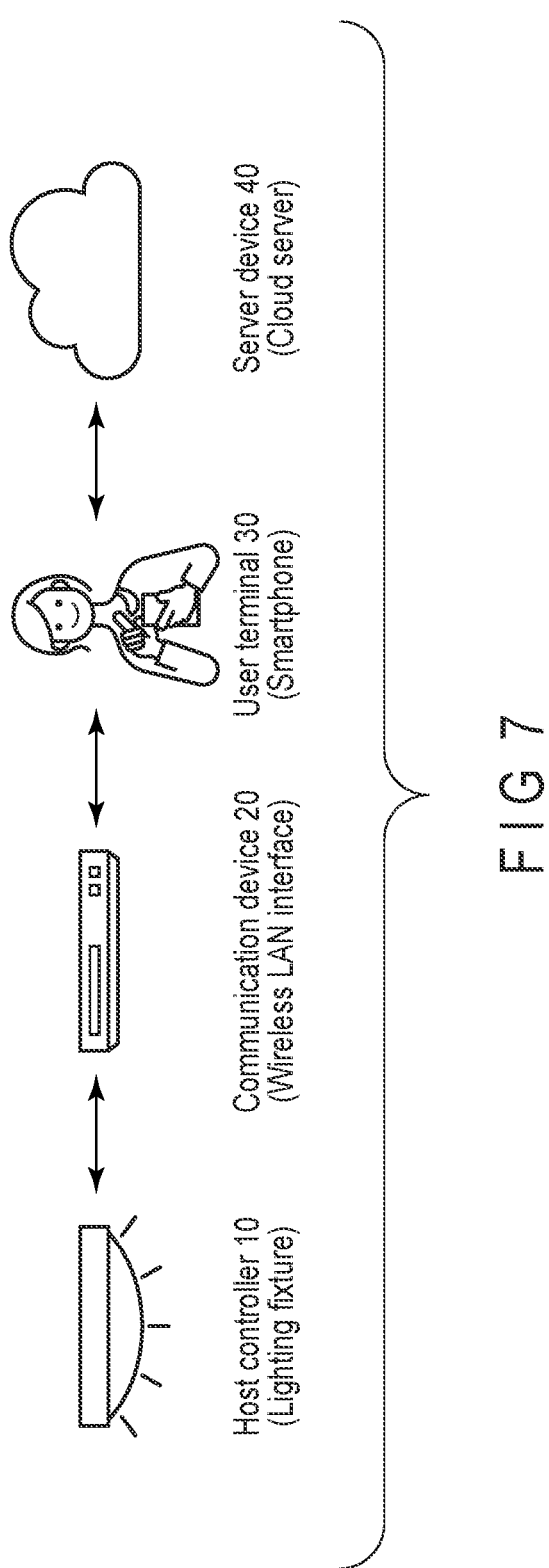
Host controller 10
(Lighting fixture)
Communication device 20
(Wireless LAN interface)
User terminal 30
(Smartphone)
Server device 40
(Cloud server)
F I G 7

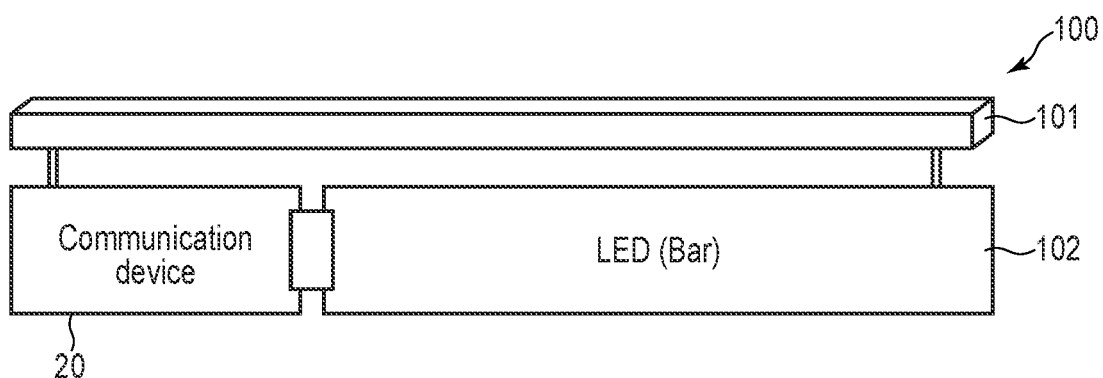
F I G. 8

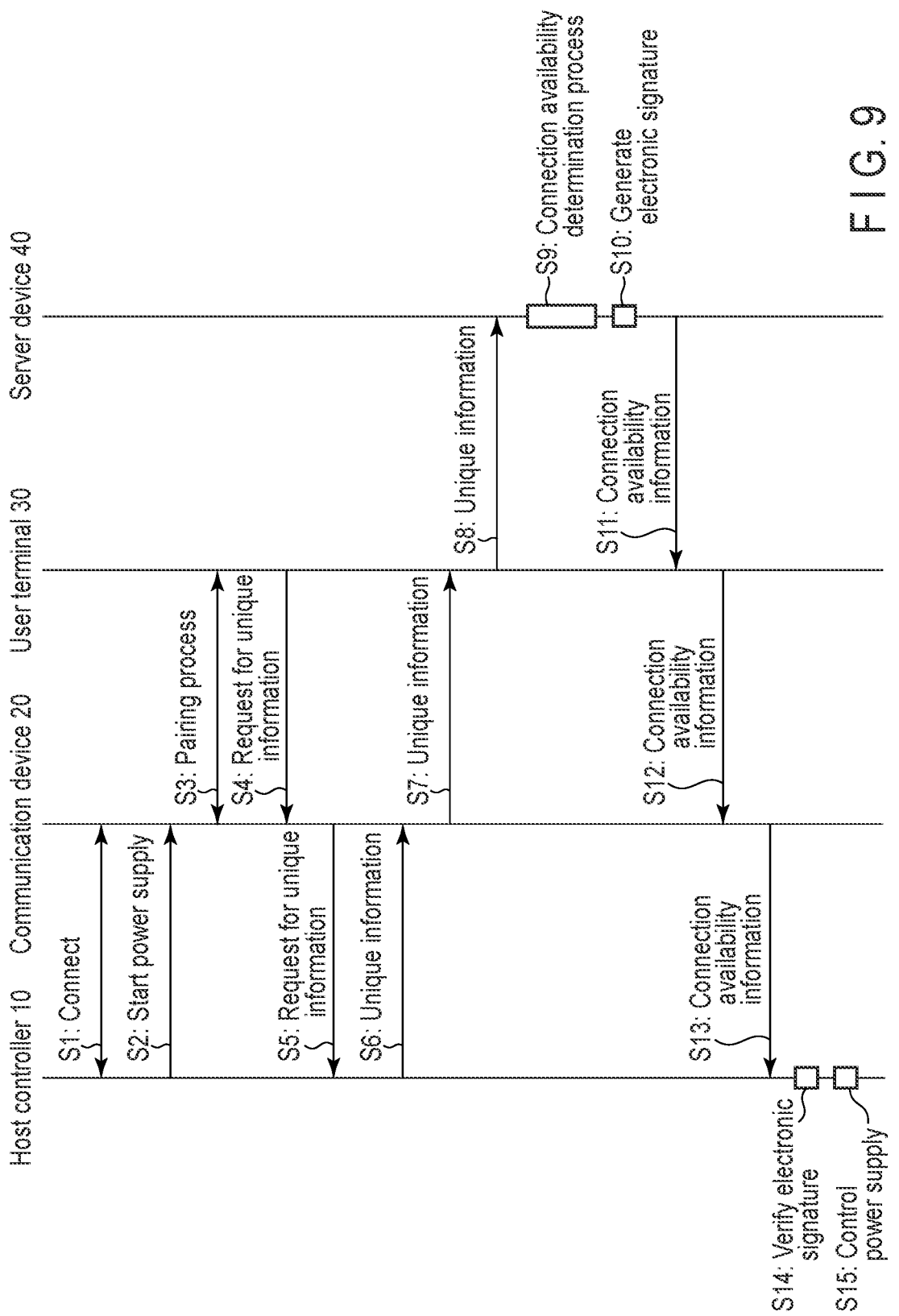
F I G. 9

| Vendor names | Models | Firmware versions | Host controller information |
|---|---|---|---|
| A | A1 | 1.2 or higher | Vendor X |
| A | A2 | 2.0 or higher | Vendor X, Vendor Y |
| A | A3 | 1.0 or higher | Vendor X, Vendor Y |
| B | B1 | 5.0 or higher | Model y of Vendor Y |
| B | B2 | 5.0 or higher | Model y of Vendor Y |
| C | C1 | any | Model x of Vendor X Firmware version of 1.0 or higher |
| ... | ... | ... | ... |

FIG. 10

| Customer ID | Host controller ID | Communication device ID | Connection confirmation date and time | Registered user ID |
|---|---|---|---|---|
| C1 | H1 | D1 | June 15, 2023 11:00:00 | U1 |
| C1 | H2 | D2 | June 15, 2023 11:05:00 | U1 |
| C1 | H3 | D3 | June 15, 2023 11:10:00 | U2 |
| C2 | H4 | D4 | June 20, 2023 11:00:00 | U2 |
| C2 | H5 | D5 | June 21, 2023 11:00:00 | U1 |
| C3 | H6 | D6 | June 25, 2023 11:00:00 | U3 |
| ... | ... | ... | ... | ... |

FIG. 11

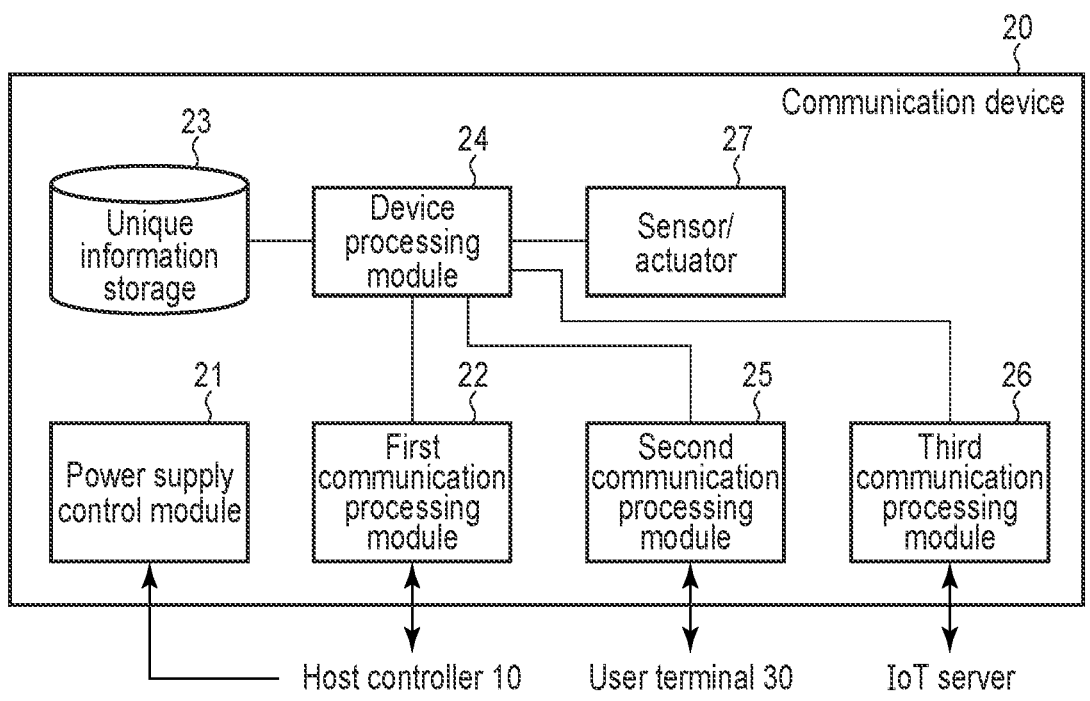
F I G. 12
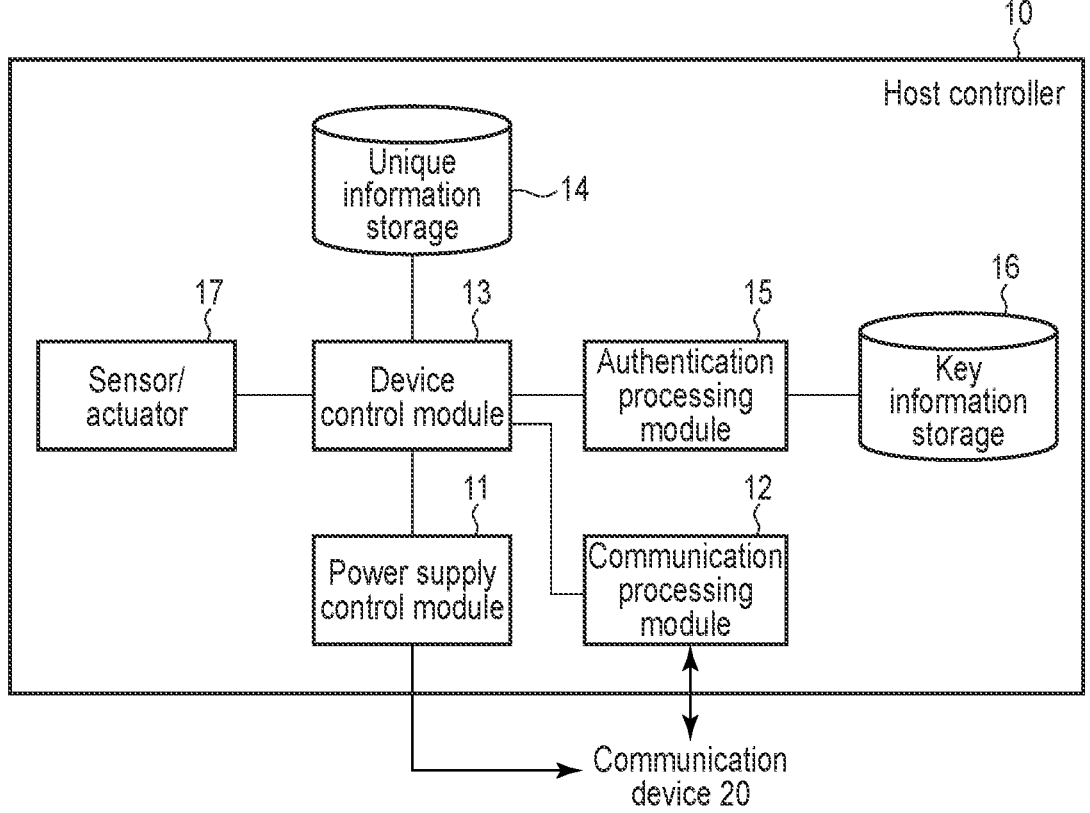
F I G. 13

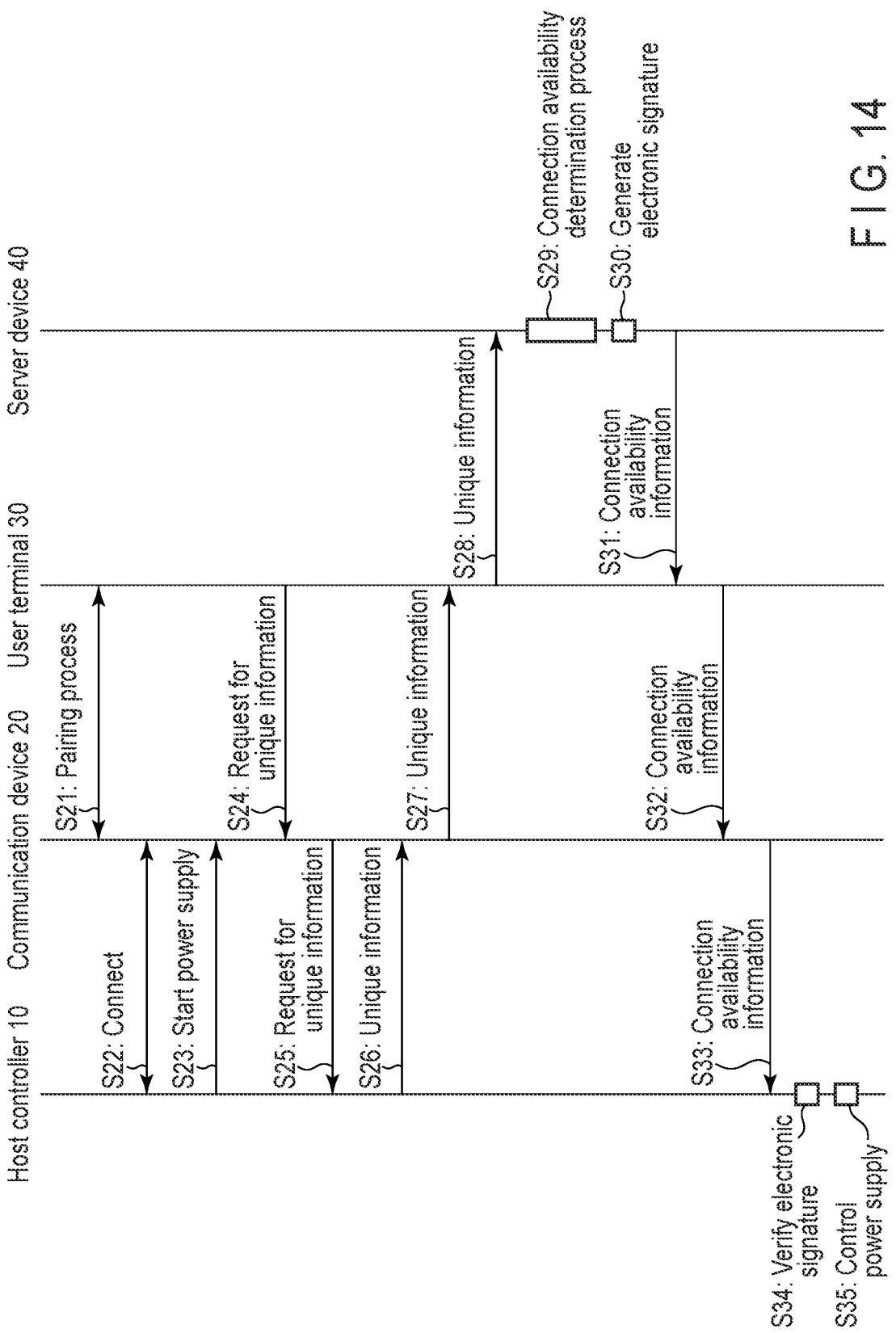
F I G. 14

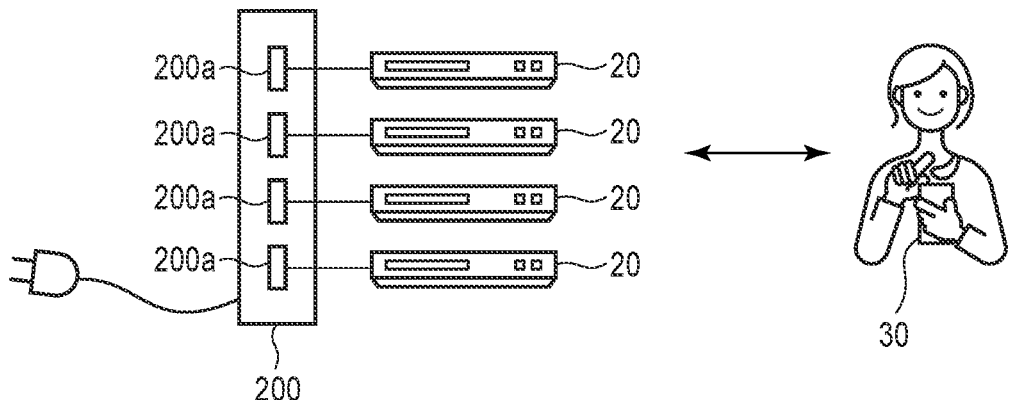
F I G. 15

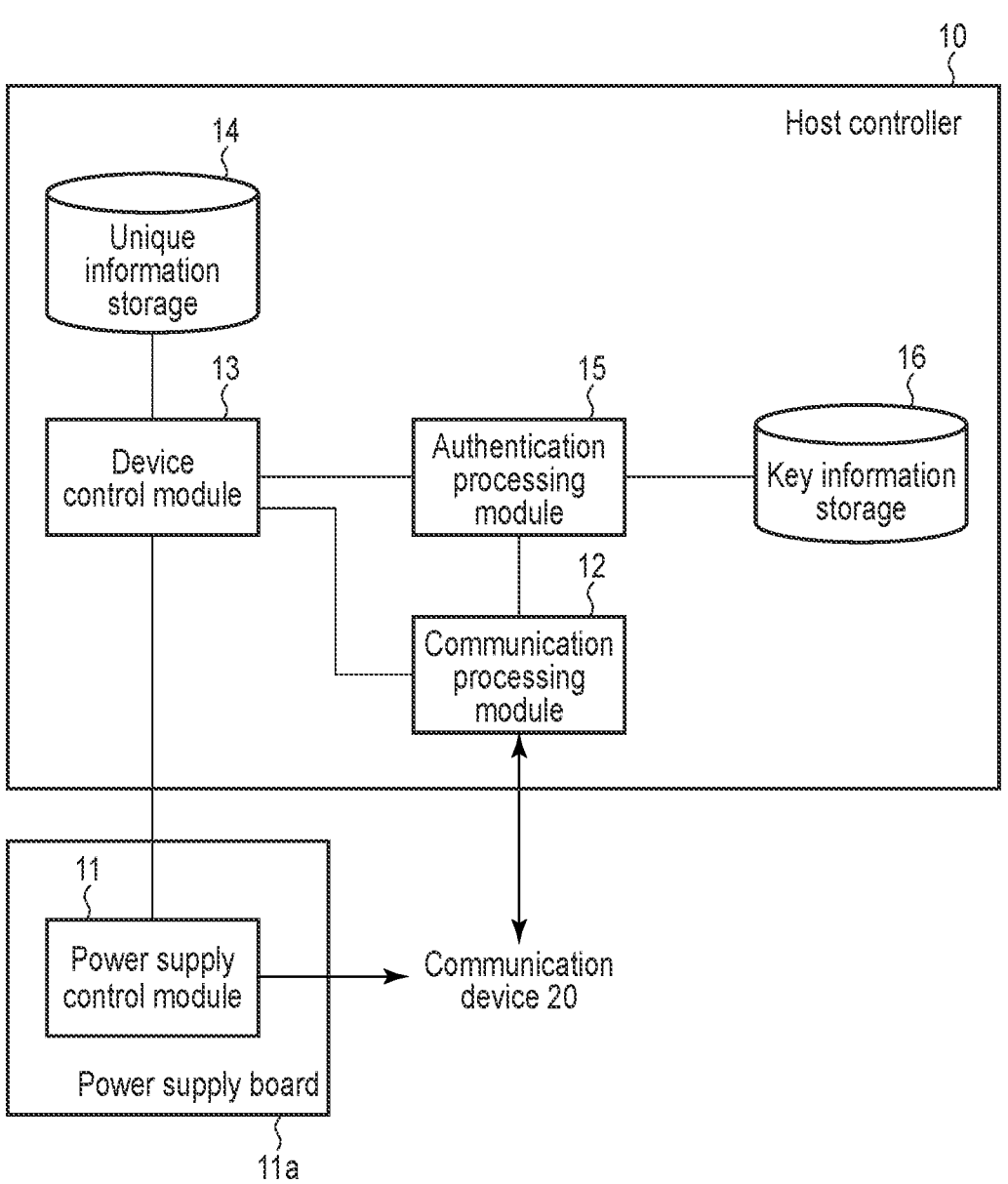
F I G. 16

COMMUNICATION SYSTEM, CONTROLLER, SERVER DEVICE AND METHOD

CROSS-REFERENCE TO RELATED APPLICATIONS

This application is based upon and claims the benefit of priority from Japanese Patent Application No. 2023-128589, filed Aug. 7, 2023, the entire contents of which are incorporated herein by reference.

FIELD

Embodiments described herein relate generally to a communication system, a controller, and a server device and a method.

BACKGROUND

In the technology referred to as Internet Of Things (IoT), edge devices (edge terminals) need to be connected to a network but, if these edge devices do not have communication functions, the edge devices can be connected to the network by connecting controllers (host controllers) mounted on the edge devices with communication devices.

For this reason, for example, a mechanism to connect an appropriate communication device to a controller mounted on an edge device without requiring complicated setting work is required.

BRIEF DESCRIPTION OF THE DRAWINGS

FIG. 3 is a view showing an example of a functional configuration of a communication device.

FIG. 4 is a view showing an example of a functional configuration of a user terminal.

FIG. 5 is a view showing an example of a functional configuration of a server device.

FIG. 6 is a view showing an example of a hardware configuration of a host controller.

FIG. 7 is a view showing an example of a specific aspect of a communication system.

FIG. 8 is a view showing a specific example of a lighting fixture.

FIG. 9 is a sequence chart showing an example of a processing procedure of the communication system.

FIG. 10 is a table showing an example of a data structure of decision information.

FIG. 11 is a table showing an example of a data structure of connection information.

FIG. 12 is a view showing another example of the functional structure of the communication device.

FIG. 13 is a view showing another example of the functional structure of the host controller.

FIG. 14 is a sequence chart showing an example of a processing procedure of a communication system in a case of executing a pairing process between the communication device and the user terminal in advance.

FIG. 15 is a view showing an example of a power feeding jig.

FIG. 16 is a view illustrating a configuration of an edge device for which a power supply board separated from the host controller is prepared.

DETAILED DESCRIPTION

In general, according to one embodiment, a communication system includes a controller provided in an edge device and a server device connected, via a network, to a communication device connected to the controller. The server device includes a first processor configured to receive first information unique to the controller and second information unique to the communication device, and determine whether the communication device is connectible to the controller, based on the received first and second information. The controller includes a second processor configured to receive connection availability information including a result of the determination from the server device via the communication device, and reject connection of the communication device, based on the received connection availability information.

Various embodiments will be described with reference to the accompanying drawings.

Figure 1:
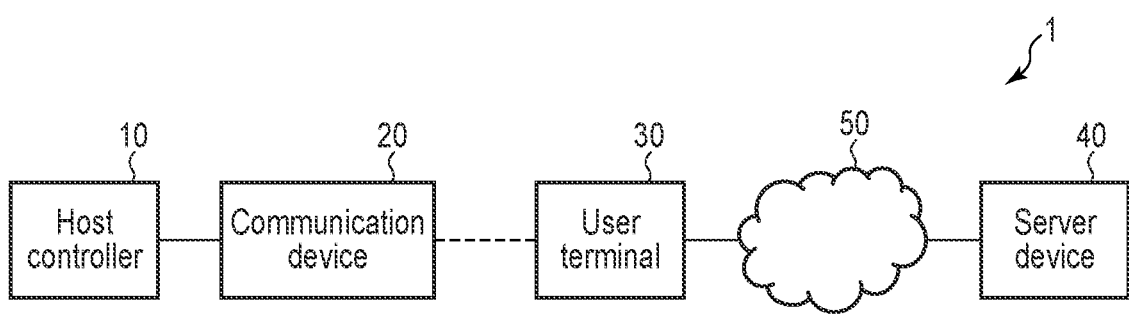
FIG. 1 is a view showing an example of a system configuration of a communication system according to an embodiment.

FIG. 1 shows an example of a system configuration of a communication system according to a present embodiment. As shown in FIG. 1, the communication system 1 includes a host controller 10, a communication device 20, a user terminal 30, and a server device 40.

In the present embodiment, it is assumed that an edge device is used in the technology referred to as IoT, and the host controller 10 is mounted on the edge device and configured to control the operation of the edge device.

It is assumed that (the edge device including) the host controller 10 in the present embodiment does not include at least a communication function to communicate with a server device for providing the IoT service (hereinafter referred to as an IoT server). In this case, the communication device 20 including a communication function to communicate with the IoT server can be connected to the host controller 10. With such a communication device 20, the host controller 10 can be connected to the IoT server via a predetermined network and can realize the function of the edge device in the above-described IoT.

Incidentally, for example, the host controller 10 and the communication device 20 are connected via a connection interface provided in the edge device such as a USB connector or a pin slot connector but, for example, serial communication such as I2C, URT and SPI or parallel communication may be executed between the host controller 10 and the communication device 20.

The user terminal 30 is, for example, an electronic device such as a smartphone, a tablet terminal, or a personal computer (PC), used by a user, and includes a function to communicate with the communication device 20. In addition, the user terminal 30 is communicably connected to the server device 40 via the network 50.

In the present embodiment, the edge device on which the host controller 10 is mounted can be used in the IoT by connecting the host controller 10 with the communication device 20 as described above but, for example, only the appropriate communication device 20 needs to be connected to the host controller 10 from the viewpoint of a request from the vendor of the host controller 10 or security. For this reason, the server device 40 in the present embodiment includes a function to determine whether or not the communication device 20 can be connected to the host controller 10 (i.e., the communication device 20 is appropriate for the host controller 10). Information including the result of such a determination executed by the server device 40 (hereinafter referred to as connection availability information) is transmitted (provided) from the server device 40 to the host controller 10.

Incidentally, wireless communication or wired communication may be executed between the communication device 20 and the user terminal 30 shown in FIG. 1. For example, communication based on Bluetooth (registered trademark) or Wi-Fi (registered trademark) or the like is assumed for wireless communication, and communication based on Ethernet (registered trademark) or the like is assumed for wired communication, but communication based on other standards may be executed.

In addition, the network 50 connecting the user terminal 30 with the server device 40 may be, for example, a small and closed network such as a local area network (LAN), a wide and closed network such as a wide area network (WAN), or an open network such as the Internet. In addition, the user terminal 30 executes communication based on, for example, Wi-Fi and cellular communication methods (such as LTE or 5G) to connect to the network 50, but may be configured to execute communication based on other standards.

Figure 2:
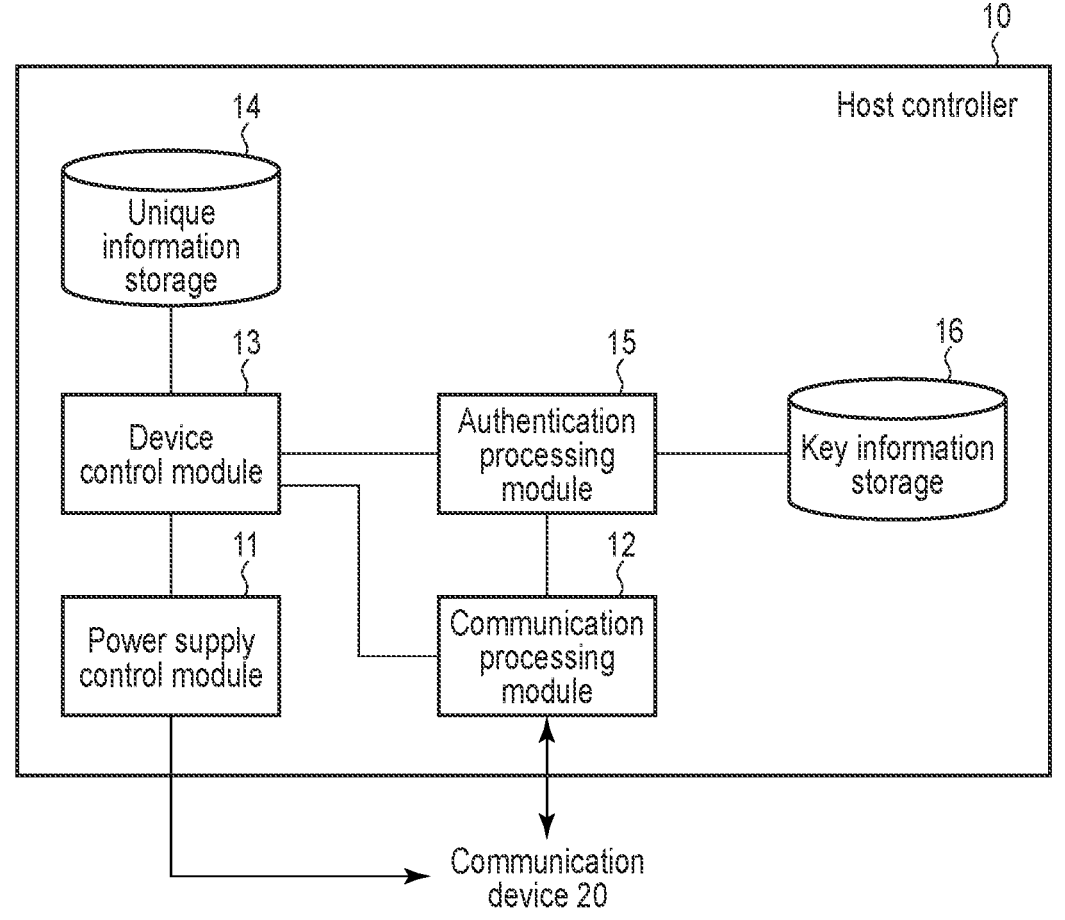
FIG. 2 is a view showing an example of a functional configuration of a host controller.

FIG. 2 shows an example of a functional configuration of the host controller 10 shown in FIG. 1. As shown in FIG. 2, the host controller 10 includes a power supply control module 11, a communication processing module 12, a device control module 13, a unique information storage 14, an authentication processing module 15, and a key information storage 16.

When the communication device 20 is connected to the host controller 10 via the above-described connection interface in the present embodiment, the power supply control module 11 supplies power to the communication device 20 in accordance with predetermined electrical specifications. The communication device 20 can operate with the power supply executed by the power supply control module 11.

The communication processing module 12 communicates with the communication device 20, which operates based on the power supply of the power supply control module 11 as described above, according to a predetermined communication method.

Incidentally, the host controller 10 and the communication device 20 are connected via a connection interface such as a USB connector or a pin slot connector as described above but, for example, the connection interface may be implemented as one connection interface that performs communication and power supply or implemented as a plurality of connection interfaces that execute communication and power supply, respectively.

The device control module 13 controls the power supply control module 11 (power supply function of the host controller 10) and the communication processing module 12 (communication function of the host controller 10). More specifically, the device control module 13 can control, for example, switching enablement and disablement of the power supply function and the communication function.

The unique information storage 14 stores information unique to the host controller 10 (hereinafter referred to as unique information of the host controller 10) in advance. The unique information of the host controller 10 includes, for example, the vendor name, model, firmware version (version of the firmware to control the host controller 10), and the like of the host controller 10. Incidentally, the unique information of the host controller 10 may also include, for example, individual identification information such as a serial number. The unique information of the host controller

10 is read from the unique information storage 14 by the device control module 13 and transmitted to the communication device 20 via the communication processing module 12.

The communication processing module 12 receives the connection availability information transmitted from the server device 40 via the communication device 20, as described below. An electronic signature (digital signature) generated by the server device 40 may be attached to the connection availability information thus received from the server device 40. The authentication processing module 15 executes the process of verifying such an electronic signature. This process of verifying the digital signature is executed using key information (for example, public key of the server device 40) stored in the key information storage 16.

FIG. 3 shows an example of a functional configuration of the communication device 20 shown in FIG. 1. As shown in FIG. 3, the communication device 20 includes a power supply control module 21, a first communication processing module 22, a unique information storage 23, a device processing module 24, and a second communication processing module 25.

The power supply control module 21 drives the communication device 20 by receiving power from the host controller 10 (power supply control module 11).

The first communication processing module 22 communicates with the host controller 10 according to a predetermined communication method. Incidentally, the first communication processing module 22 receives the unique information of the host controller 10 transmitted from the host controller 10.

The unique information storage 23 stores information unique to the communication device 20 (hereinafter referred to as the unique information of the communication device 20) in advance. The unique information of the communication device 20 includes, for example, the vendor name, model, firmware version (version of the firmware for controlling the communication device 20), and the like of the communication device 20. Incidentally, the unique information of the communication device 20 may include, for example, individual identification information such as a serial number and a Media Access Control (MAC) address.

The device processing module 24 obtains the unique information of the host controller 10 received by the first communication processing module 22 and outputs the obtained unique information to the second communication processing module 25. In addition, the device processing module 24 reads the unique information of the communication device 20 from the unique information storage 23 and outputs the read unique information to the second communication processing module 25. Furthermore, the device processing module 24 executes processing (i.e., processing unique to the device) according to the edge device in the IoT.

The second communication processing module 25 communicates with the user terminal 30 according to a predetermined communication method. Incidentally, the second communication processing module 25 transmits the unique information of the host controller 10 and the communication device 20 output from the device processing module 24 to the user terminal 30 as described above. In addition, the second communication processing module 25 receives the connection availability information transmitted from the server device 40 via the user terminal 30. The connection availability information thus received by the second communication processing module 25 is transmitted to the host controller 10 by the first communication processing module 22.

FIG. 4 shows an example of a functional configuration of the user terminal 30 shown in FIG. 1. As shown in FIG. 4, the user terminal 30 includes a first communication processing module 31, a second communication processing module 32, and an initial setting processing module 33.

The first communication processing module 31 communicates with the communication device 20 according to a predetermined communication method. The second communication processing module 32 communicates with the server device 40 via the network 50.

Incidentally, the first communication processing module 31 receives the unique information of the host controller 10 and the communication device 20 transmitted from the communication device 20. The initial setting processing module 33 obtains the unique information of the host controller 10 and the communication device 20 thus received by the first communication processing module 31, and transmits the obtained unique information to the server device 40 via the second communication processing module 32.

In addition, the second communication processing module 32 receives the connection availability information transmitted from the server device 40. The initial setting processing module 33 obtains the connection availability information thus received by the second communication processing module 32 and transmits the obtained connection availability information to the communication device 20 via the first communication processing module 31.

The initial setting processing module 33 executes a first setting process for the first communication processing module 31 for communicating with the communication device 20 and a second setting process for the second communication processing module 32 for communicating with the server device 40.

Incidentally, the initial setting processing module 33 executes a process for pairing the communication device 20 with the user terminal 30 (hereinafter referred to as a pairing process) as the first setting process. Registering the devices in Bluetooth is generally referred to as pairing, but implementing a state in which two devices can communicate with each other by recognizing mutual communication addresses or authenticating each other is referred to as pairing in the present embodiment.

In addition, the initial setting processing module 33 executes an authentication process such as accepting input of a user ID and a password by a user using the user terminal 30, as the second setting process. Alternatively, the initial setting processing module 33 may execute the other preliminary setting process related to security or the like.

FIG. 5 shows an example of a functional configuration of the server device 40 shown in FIG. 1. As shown in FIG. 5, the server device 40 includes a communication processing module 41, a determination module 42, a key information storage 43, and a determination information storage 44.

The communication processing module 41 communicates with the user terminal 30 via the network 50. Incidentally, the communication processing module 41 receives the unique information of the host controller 10 and the communication device 20 transmitted from the user terminal 30.

The determination module 42 obtains the unique information of the host controller 10 and the communication device 20 received by the communication processing module 41, and determines whether or not the communication device 20 can be connected to the host controller 10, based on the obtained unique information. Incidentally, the determination process of the determination module 42 is executed using the determination information stored in the determination information storage 43. Details of the determination information stored in the determination information storage 43 will be described below.

The determination module 42 generates an electronic signature (digital signature) that is attached to the connection availability information including the determination result of the determination module 42. Incidentally, the electronic signature is generated using the key information (for example, the private key of the server device 40) stored in the key information storage 44.

The connection availability information to which the electronic signature generated as described above is attached is transmitted to the user terminal 30 by the communication processing module 41.

FIG. 6 shows an example of a hardware configuration of the above-described host controller 10. As shown in FIG. 6, the host controller 10 includes a processor 10a, a nonvolatile memory 10b, a main memory 10c, a communication interface (I/F) 10d, a power supply interface (I/F), and the like.

The processor 10a is configured to control the operation of each component in the host controller 10 and may be, for example, a CPU or the like. Alternatively, the processor 10a may be a single processor or may be composed of a plurality of processors. The processor 10a executes various programs that are loaded from the nonvolatile memory 10b into the main memory 10c. The communication interface 10d is, for example, an interface which realizes communication with the communication device 20. The power supply interface 10e is, for example, an interface which realizes power supply to the communication device 20.

In the present embodiment, some or all of the power supply control module 11, the communication processing module 12, the device control module 13, and the authentication processing module 15 shown in FIG. 2 may be realized by urging the processor 10a shown in FIG. 6 to execute a predetermined program (i.e., software), by hardware such as an integrated circuit (IC) or the like, or by a configuration obtained by combining software and hardware.

In addition, in the present embodiment, the unique information storage 14 and the key information storage 16 shown in FIG. 2 are realized by the nonvolatile memory 10b shown in FIG. 6.

The hardware configuration of the host controller 10 has been described, but it is assumed that the communication device 20, the user terminal 30, and the server device 40 also have substantially the same hardware configuration.

In this case, some or all of the power supply control module 21, the first communication processing module 22, the device processing module 24, and the second communication processing module 25 shown in FIG. 3 may be realized by urging the processor (CPU) provided in the communication device 20 to execute a predetermined program, by hardware, or by a configuration obtained by combining software and hardware. The unique information storage 23 shown in FIG. 3 is realized by a nonvolatile memory provided in the communication device 20.

In addition, some or all of the first communication processing module 31, the second communication processing module 32, and the initial setting processing module 33 shown in FIG. 4 may be realized by urging the processor (CPU) provided in the user terminal 30 to execute a predetermined program (application program), by hardware, or by a configuration obtained by combining software and hardware.

Furthermore, some or all of the communication processing module 41 and the determination module 42 shown in FIG. 5 may be realized by urging the processor (CPU) provided in the server device 40 to execute a predetermined program (application program), by hardware, or by a configuration obtained by combining software and hardware. The key information storage 43 and the determination information storage 44 shown in FIG. 5 are realized by the nonvolatile memory provided in the server device 40.

FIG. 7 shows an example of a specific aspect of the above-described communication system 1 shown in FIG. 1.

In the example shown in FIG. 7, it is assumed that an edge device incorporating the host controller 10 is a lighting fixture, the communication device 20 is a wireless LAN interface, the user terminal 30 is a smartphone, and the server device 40 is a cloud server providing cloud computing services.

According to such a communication system 1, connection between the lighting fixture and the wireless LAN interface can be permitted or rejected by, for example, determining permission of the connection between the lighting fixture and the wireless LAN interface at the cloud server. Incidentally, if the connection between the lighting fixture and the wireless LAN interface is permitted, IoT services such as collecting sensor data related to the lighting fixture measured by various sensors or remotely driving the lighting fixture can be realized.

In addition, FIG. 8 shows a specific example of the above-described lighting fixture (edge device). In the example shown in FIG. 8, a lighting fixture 100 includes a lighting fixture body 101 and an LED (bar) 102.

Although not shown in FIG. 8, the lighting fixture body 101 incorporates the host controller 10, and the host controller 10 is connected to the communication device 20 (wireless LAN interface). The lighting fixture body 101 (host controller 10) is connected to, for example, a commercial power source, and can supply power to the communication device 20 connected to the host controller 10.

The LED 102 is supplied with power from the lighting fixture body 101. In addition, for example, the communication device 20 incorporates an actuator which drives the LED 102, and the actuator is connected to the LED 102 via a dimming I/F. According to this, for example, the LED 102 can be dimmed by controlling the actuator, based on a control signal received in the communication device 20.

An example of the processing procedure of the communication system 1 according to the present embodiment will be described below with reference to a sequence chart of FIG. 9.

First, it is assumed that (the edge device incorporating) the host controller 10 and the communication device 20 are connected via a connection interface (step S1).

When the process of step S1 is executed, the connection of the communication device 20 is recognized by the host controller 10, and the device control module 13 included in the host controller 10 instructs the power supply control module 11 to supply power to the communication device 20. As a result, the power supply control module 11 starts supplying power to the communication device 20 (step S2).

When the process of step S2 is executed, power supply from the host controller 10 to the communication device 20 is executed, and the power supply control module 21 included in the communication device 20 drives the communication device 20 by receiving the power supply. As a result, the communication device 20 starts operating.

In this case, the device control module 13 included in the host controller 10 instructs the communication processing module 12 to execute data communication with the communication device 20. According to this, communication between the host controller 10 and the communication device 20 can be executed.

When the communication device 20 starts operating as described above, the initial setting processing module 33 included in the user terminal 30 executes the pairing process as the first setting process for the first communication processing module 31 to communicate with the communication device 20 (step S3). Incidentally, the information on pairing (for example, information on a partner with whom pairing has been completed) is held in the communication device 20 and the user terminal 30, the pairing process is executed when it is recognized that pairing of the communication device 20 and the user terminal 30 has not been completed based on the information on pairing.

More specifically, for example, when the communication device 20 in the initialized state starts operating (i.e., power is supplied to the communication device 20), the communication device 20 becomes a state of waiting for pairing. The initial setting processing module 33 included in the user terminal 30 executes the pairing process according to the communication method with the communication device 20. For example, when the communication method is Bluetooth, the communication device 20 is displayed as a device that can be paired on the graphical user interface (GUI) prepared in the user terminal 30, and the pairing process is executed by the user selecting the displayed communication device 20 by a predetermined operation. In addition, when the communication method is Wi-Fi, the communication device 20 operates as a Wi-Fi access point, predetermined SSID and a predetermined password are input to the user terminal 30, and the pairing process is thereby executed (i.e., the user terminal 30 becomes connectible to the Wi-Fi network of the communication device 20).

When the above-described pairing is completed (successful), the information of the user terminal 30 that has completed pairing with the communication device 20 is held in the communication device 20, and the information of the communication device 20 that has completed pairing with the user terminal 30 is held in the user terminal 30. As a result, the user terminal 30 can communicate with the communication device 20.

Incidentally, the communication device 20 and the user terminal 30 may be connected by a wired manner but, in such a case, an explicit pairing process may be omitted.

By the way, for example, when the user terminal 30 executes communication with the communication device 20 based on Bluetooth, the user terminal 30 needs to be located within a range of communication with the communication device 20. In other words, when the user terminal 30 is not located within the range of communication with the communication device 20, pairing cannot be completed (pairing fails).

If pairing cannot be completed, no connection availability information is received via the communication device 20, and power supply from the host controller 10 to the communication device 20 therefore does not need to be continued. Therefore, for example, if no connection availability information is received from the server device 40, power supply from the host controller 10 to the communication device 20 may be stopped. In this case, for example, if no connection availability information is received before a certain period of time elapses after power supply to the communication device 20 is started, the power supply control module 11 included in the host controller 10 can stop power supply. More specifically, for example, expiration date information indicative of an expiration date calculated by adding the above-described certain period to the date and time when the host controller 10 and the communication device 20 are connected may be set, and power supply may be stopped when the expiration date expires.

In contrast, a communication error may occur due to the communication environment between the communication device 20 and the user terminal 30, and pairing may not be able to be completed. However, if the communication error occurs temporarily, pairing may be completed by executing the pairing process again once the communication error is resolved. In such a case, if the power supply to the communication device 20 is stopped, the communication device 20 cannot operate and the pairing process cannot be executed. For this reason, even if power supply to the communication device 20 is stopped for the reason that the connection availability information is not received before a certain period of time elapses as described above, the power supply control module 11 included in the host controller 10 may resume power supply when a predetermined period of time has further elapsed since the power supply is stopped. Incidentally, the resumption of power supply to the communication device 20 may be realized by manual operation on the host controller 10. In addition, for example, power supply to the communication device 20 may be able to be executed temporarily by an operation of pressing a button provided on the host controller 10 for a certain period of time.

When the process of step S3 is executed, the initial setting processing module 33 included in the user terminal 30 requests the unique information from the communication device 20 via the first communication processing module 31 (step S4). Incidentally, for example, the process of step S4 may be executed automatically after the process of step S3 is executed or may be executed in response to the user operation on the user terminal 30.

The device processing module 24 included in the communication device 20 accepts a request from the user terminal 30 via the second communication processing module 25 and requests the unique information from the host controller 10 via the first communication processing module 22 (step S5).

The device control module 13 included in the host controller 10 accepts the request from the communication device 20 via the communication processing module 12. Based on the accepted request, the device control module 13 reads the unique information of the host controller 10 from the unique information storage 14.

The (response message including) unique information of the host controller 10 which is read from the unique information storage 14 is transmitted to the communication device 20 via the communication processing module 12 (step S6). The unique information of the host controller 10 transmitted in step S6 is received by the first communication processing module 22 included in the communication device 20.

In addition, the device processing module 24 included in the communication device 20 reads the unique information of the communication device 20 from the unique information storage 23, based on the request from the user terminal 30 which is received via the second communication processing module 25 as described above.

The (response message including) unique information of the host controller 10 received by the first communication processing module 22 and unique information of the communication device 20 read from the unique information storage 23 is transmitted to the user terminal 30 via the second communication processing module 25 as described above (step S7). The unique information of the host controller 10 and the communication device 20 thus transmitted in step S7 is received by the first communication processing module 31 included in the user terminal 30.

If it is assumed that the edge device is a lighting fixture as described above, a plurality of lighting fixtures may be installed in the ceiling or the like and, for example, the communication device 20 may be accidentally connected to a lighting fixture different from the lighting fixture assumed by the user. In this case, the unique information received by the user terminal 30 (first communication processing module 31) may not be the information which the user intends. Furthermore, when wireless communication is executed between the communication device 20 and the user terminal 30, the possibility that the user terminal 30 (first communication processing module 31) receives the unique information prepared by a malicious third party cannot be denied.

For this reason, when the unique information of the host controller 10 and the communication device 20 is received by the user terminal 30 as described above, the unique information may be displayed on a display provided in the user terminal 30 to urge the user to confirm the validity of the unique information. Furthermore, for example, the unique information encoded in the code may be obtained by reading a one-dimensional code (bar code) or two-dimensional code (QR code (registered trademark)) attached to the host controller 10 (or the edge device incorporating the host controller 10) and the main body (housing) of the communication device 20, by using a camera mounted on the user terminal 30, and the validity of the unique information may be verified (confirmed) by comparing (checking) the obtained unique information with the received unique information.

Next, the second communication processing module 32 included in the user terminal 30 transmits the unique information of the host controller 10 and the communication device 20, which is received by the first communication processing module 31, to the server device 40 via the network 50 (step S8). Incidentally, it is assumed that the second setting process for the second communication processing module 32 for the user terminal 30 to communicate with the server device 40 has already been completed at the time when the process of step S8 is executed. In addition, in step S8, information other than the above-described unique information of the host controller 10 and the communication device 20 (for example, the location where the host controller 10 and the communication device 20 are installed, information on users who use the host controller 10 and the communication device, and the like) may be further transmitted.

When the process of step S8 is executed, the communication processing module 41 included in the server device 40 receives the unique information of the host controller 10 and the communication device 20, which is transmitted in step S8.

The determination module 42 included in the server device 40 executes a process (hereinafter referred to as a connection availability determination process) of determining whether or not the communication device 20 can be connected to the host controller 10 (i.e., continuous power supply of the host controller 10 to the communication device 20 and data communication between the host controller 10 and the communication device 20 are permitted), based on the unique information of the host controller 10 and the communication device 20, which is received by the communication processing module 41, and the determination information stored in the determination information storage 44 (step S9).

FIG. 10 shows an example of the data structure of the determination information stored in the determination information storage 44. As shown in FIG. 10, the determination information includes the vendor name, model, firmware version, and host controller information in association with each other.

The vendor name is indicative of the vendor name (name of the vendor) of the communication device 20. The model is indicative of the model of the communication device 20. The firmware version is indicative of the firmware version of the communication device 20 (i.e., version of the firmware for controlling the communication device 20). Incidentally, the vendor name, model, and firmware version are information obtained from the unique information of the communication device 20 (i.e., information unique to the communication device 20), and are considered as information for identifying the communication device 20 connected to the host controller 10.

The host controller information corresponds to the condition of the host controller that can be interconnected with the communication device 20, and is represented by, for example, the vendor name and model of the host controller 10, and the firmware version of the host controller 10 (i.e., the version of the firmware for controlling the host controller 10). Incidentally, the vendor name, model, and firmware version of the host controller 10 are obtained from the unique information of the host controller 10.

In the example shown in FIG. 10, for example, the determination information including vendor name "A", model "A1", firmware version "1.2 or higher" and host controller information "vendor X" in association with one another is shown. According to such determination information, it is shown that a communication device 20 with vendor name "A", model "A1", and firmware version "1.2 or higher" can be connected to a host controller 10 with vendor name "X".

In addition, in the example shown in FIG. 10, for example, the determination information including vendor name "A", model "A2", firmware version "2.0 or higher", and host controller information "vendor X, vendor Y" in association with one another is shown. According to such determination information, it is shown that a communication device 20 with vendor name "A", model "A2", and firmware version "2.0 or higher" can be connected to a host controller 10 with vendor name "X" or "Y".

In addition, in the example shown in FIG. 10, for example, the determination information including vendor name "A", model "A3", firmware version "1.0 or higher", and host controller information "vendor X, vendor Y" in association with one another is shown. According to such determination information, it is shown that a communication device 20 with vendor name "A", model "A3", and firmware version "1.0 or higher" can be connected to a host controller 10 with vendor name "X" or "Y".

In addition, in the example shown in FIG. 10, for example, the determination information including vendor name "B", model "B1", firmware version "5.0 or higher", and host controller information "model y of vendor Y" in association with one another is shown. According to such determination information, it is shown that a communication device 20 with vendor name "B", model "B1", and firmware version "5.0 or higher" can be connected to a host controller 10 with vendor name "Y" and model "Y".

In addition, in the example shown in FIG. 10, for example, the determination information including vendor name "B", model "B2", firmware version "5.0 or higher", and host controller information "model y of vendor Y" in association with one another is shown. According to such determination information, it is shown that a communication device 20 with vendor name "B", model "B2", and firmware version "5.0 or higher" can be connected to a host controller 10 with vendor name "Y" and model "y".

In addition, in the example shown in FIG. 10, for example, the determination information including vendor name "C", model "C1", firmware version "any", and host controller information "model x of vendor X, firmware version of 1.0 or higher" in association with one another is shown. According to such determination information, it is shown that a communication device 20 with vendor name "C" and model "C1" can be connected to a host controller 10 with vendor name "X", model "x", and firmware version "1.0 or higher". Incidentally, the firmware version "any" indicates that the firmware version is not specified (and may be any version).

According to the above-described determination information, it can be determined whether or not various communication devices 20 can be connected to the host controller 10.

The connection availability determination process executed using the above-described determination information will be simply described below. First, the determination module 42 obtains the vendor name, model, and firmware version of the communication device 20 from the unique information of the communication device 20 received by the communication processing module 41, and checks the host controller information (i.e., the condition of the connectible host controller) included in the determination information in association with the obtained vendor name, model, and firmware version, against the unique information of the host controller 10 received by the communication processing module 41. In this case, the determination module 42 determines that the communication device 20 can be connected to the host controller 10 when the unique information of the host controller 10 matches the host controller information (i.e., the condition of connectible host controller is met).

More specifically, in the example shown in FIG. 10, for example, if it is assumed that vendor name "A", model "A1", and firmware version "1.2 or higher" are obtained from the unique information of the communication device 20, it is determined that the communication device 20 can be connected to the host controller 10 when the vendor name in the unique information of the host controller 10 is "X".

In contrast, the determination module 42 determines that the communication device 20 cannot be connected to the host controller 10 when the unique information of the host controller 10 does not match the host controller information included in the determination information in association with the vendor name, model, and firmware version obtained from the unique information of the communication device 20 (i.e., the condition of connectible host controller is not met).

In other words, the determination information in the present embodiment is considered as information which indicates the combination of the host controller 10 and communication device 20 that are interoperable (i.e., the communication device 20 that is a legitimate device for the host controller 10).

The data structure of the determination information has been described with reference to FIG. 10, but the data structure of the determination information may be different from FIG. 10. In addition, the server device 40 in the present embodiment may be configured to determine whether or not the communication device 20 can be connected to the host controller 10 based on the unique information of the host controller 10 and the communication device 20, and the above-described connection availability determination process may be a process other than the described process.

When the process of step S9 is executed, the determination module 42 reads, for example, a private key of the server device 40 (i.e., a private key for the server device 40 generated based on a public key cryptography) from the key information storage 43, and generates the electronic signature attached to the connection availability information including the result of the process in step S9 (i.e., the determination result of the connection availability determination process) using the private key of the server device 40 (step S10). Incidentally, the electronic signature is generated by, for example, an encryption process for a hash value of the connection availability information calculated by the determination module 42, using the private key of the server device 40.

When the process of step S10 is executed, the communication processing module 41 transmits the connection availability information to which the electronic signature generated in step S10 is attached, to the user terminal 30 (step S11).

The connection availability information transmitted in step S11 is received by the second communication processing module 32 included in the user terminal 30 and is transmitted (transferred) to the communication device 20 by the first communication processing module 31 (step S12).

Similarly, the connection availability information transmitted in step S12 is received by the second communication processing module 25 included in the communication device 20 and is transmitted (forwarded) to the host controller 10 by the first communication processing module 22 (step S13).

The connection availability information transmitted in step S13 is received by the communication processing module 12 included in the host controller 10. The authentication processing module 15 verifies the electronic signature attached to the connection availability information received by communication processing module 12 (step S14).

It is assumed that the electronic signature attached to the connection availability information is generated by encrypting the hash value of the relevant connection availability information with the private key of the server device 40, as described above. In this case, the public key (public key of the server device 40) paired with the private key of the server device 40 is stored in advance in the key information storage 16 included in the host controller 10. In step S14, for example, a process of calculating the hash value of the connection availability information received by the communication processing module 12, and checking the calculated hash value against the result of encrypting the electronic signature attached to the connection availability information with the public key of the server device 40, is executed.

When the hash value of the connection availability information matches the hash value obtained from the electronic signature (i.e., the verification of the electronic signature is successful) in step S14 described above, the device control module 13 processes the content of the determination result included in the connection availability information and controls power supply from the host controller 10 to the communication device 20 (step S15).

More specifically, when the connection availability information includes the determination result that the communication device 20 can be connected to the host controller 10, the device control module 13 instructs the power supply control module 11 to continue supplying power to the communication device 20 in order to permit connection with the communication device 20. According to this, the power supply control module 11 continues to supply power to the communication device 20, and the communication between the host controller 10 and the communication device 20 is maintained.

In contrast, when the connection availability information includes a determination result that the communication device 20 cannot be connected to the host controller 10, the device control module 13 instructs the power supply control module 11 to stop supplying power to the communication device 20 in order to reject the connection with the communication device 20. According to this, the power supply control module 11 stops supplying power to the communication device 20, and the communication between the host controller 10 and the communication device 20 is disconnected (cancelled).

Incidentally, the connection availability information may include, for example, expiration date information indicating the expiration date of the connection availability information. According to this, for example, when the expiration date indicated by the expiration date information included in the connection availability information has expired, the device control module 13 discards the connection availability information and instructs the power supply control module 11 to stop supplying power from the host controller 10 to the communication device 20. For example, the (expiration date indicated by) expiration date information is specified (set) in the server device 40.

In addition, even when the power supply to the communication device 20, which is executed by the power supply control module 11, is stopped as described above, the server device 40 may be urged to execute the connection availability determination process again by temporarily restarting the power supply after a certain period of time.

Incidentally, if the hash value of the connection availability information does not match the hash value obtained from the digital signature (i.e., the verification of the digital signature fails) in step S14 described above, the device control module 13 discards the connection availability information and, for example, instructs the power supply control module 11 to stop supplying power to the communication device 20.

Although omitted in FIG. 9, the verification of the electronic signature attached to the above-described connection availability information (i.e., the process in step S14) may be executed in, for example, the communication device 20. To execute this verification of the electronic signature in the communication device 20, the public key of the server device 40 may be held in advance in the communication device 20. In a case where the electronic signature attached to the connection availability information is verified at the communication device 20 as described above, the process in step S13 and subsequent processes are performed if the verification is successful or the connection availability information is discarded and the processes shown in FIG. 9 are ended if the verification fails.

Furthermore, it has been described with reference to FIG. 9 that the electronic signature is attached to the connection availability information, but the electronic signature may also be attached to the unique information of the host controller 10. The electronic signature attached to the unique information of the host controller 10 can be generated at the host controller 10 using, for example, the private key of the host controller 10 that is stored in advance in the key information storage 16 included in the host controller 10. In this case, the public key of the host controller 10 is stored in advance in the key information storage 43 included in the server device 40, and the verification of the electronic signature attached to the unique information of the host controller 10 is executed using the public key of the host controller 10 before the process of step S9 is executed. According to the configuration in which the electronic signature attached to the unique information of the host controller 10 is verified in the server device 40, the process in step S9 and subsequent processes are executed if the verification is successful or the unique information is discarded and the process shown in FIG. 9 is ended if the verification fails.

Similarly, an electronic signature may be attached to the unique information of the communication device 20. The electronic signature attached to the unique information of the communication device 20 can be generated by the communication device 20 using the private key of the communication device 20 held in advance in the communication device 20. In this case, the public key of the communication device 20 is stored in advance in the key information storage 43 included in the server device 40, and the verification of the electronic signature attached to the unique information of the communication device 20 is executed using the public key of the communication device 20 before the process of step S9 is executed. According to the configuration in which the electronic signature attached to the unique information of the communication device 20 is verified in the server device 40, the process in step S9 and subsequent processes are executed if the verification is successful or the unique information is discarded and the process shown in FIG. 9 is ended if the verification fails.

Incidentally, it has been described that the electronic signatures are attached to the connection availability information and the unique information but, in the present embodiment, the electronic signatures (and verification of the electronic signatures) may be omitted. Furthermore, although detailed descriptions are omitted, in the communication executed in the present embodiment (for example, the communication between the communication device 20 and the user terminal 30 or the communication between the user terminal 30 and the server device 40), the authentication process other than the above-described processes may be executed, and processes such as encryption and decryption for the communication data may be executed.

By the way, when the communication between the host controller 10 and the communication device 20 is maintained (i.e., the connection between the host controller 10 and the communication device 20 is permitted) by executing the above-described processes shown in FIG. 9, the server device 40 may manage information indicating that the connection is permitted (hereinafter referred to as connection information).

FIG. 11 shows an example of a data structure of the connection information. As shown in FIG. 11, the connection information includes customer ID, host controller ID, communication device ID, connection confirmation date and time, and registered user ID in association with one another.

The customer ID is identification information for identifying the customer who manages the edge device (or the site where the edge device is installed). The host controller ID is identification information for identifying the host controller 10 installed in the edge device managed by the customer identified by the customer ID. The communication device ID is identification information for identifying the communication device 20 that is permitted to communicate with the host controller 10 identified by the host controller ID. The connection confirmation date and time is the date and time when the connection between the host controller 10 identified by the host controller ID and the communication device 20 identified by the communication device ID was permitted (confirmed). The registered user ID is identification information for identifying the user who was using the user terminal 30 when the connection between the host controller 10 and the communication device 20 identified by the communication device ID was permitted (i.e., the above-described process in FIG. 9 was executed).

Although detailed description is omitted, the connection between the host controller 10 and the communication device 20 mounted on the edge device installed in each customer site can be managed according to the above-described connection information. In addition, the connection information can be used as, for example, information for managing the locations where the host controller 10 and the communication device 20 are installed (installation location management information).

Incidentally, when a customer has (manages) a plurality of sites, the connection information may further include information (site ID and the like) for identifying such sites. Furthermore, the connection information may further include unique information (type, firmware version, and the like) of the host controller 10 and communication device 20. In addition, the connection information may further include, for example, information to be set in the communication device 20, and the like.

In addition, it has been described that the connection information is the information indicating that the connection between the host controller 10 and the communication device 20 is permitted, but the connection information may also include information indicating that the connection between the host controller 10 and the communication device 20 is rejected.

By the way, when the connection between the host controller 10 and the communication device 20 is permitted by executing the above-described process shown in FIG. 9 and when power supply from the host controller 10 to the communication device 20 continues, the edge device incorporating the host controller 10 may use the communication function of the communication device 20, and the device processing module 24 included in the communication device 20 can execute the processing according to the edge device in the IoT.

It is assumed that the communication device 20 further includes, for example, a third communication processing module 26 which communicates with an IoT server (a server device for providing IoT services) and a sensor/actuator 27, as shown in FIG. 12. FIG. 12 is a view mainly showing a functional configuration of the communication device 20, and the sensor/actuator 27 corresponds to a part of the hardware configuration of the communication device 20.

In such a configuration, for example, when the communication device 20 includes a sensor 27, the device processing module 24 can execute, for example, a process to periodically transmit sensor data measured by the sensor 27 to the IoT server via the third communication processing module 26. Incidentally, for example, the sensor data may be transmitted via the second communication processing module 25.

In addition, for example, when the communication device 20 includes an actuator 27, the device processing module 24 can receive, for example, a control signal transmitted from the IoT server via the third communication processing module 26 and execute a process to control the actuator 27 based on the control signal. Incidentally, the control signal may be a control signal to control the sensor 27 provided in the communication device 20. In addition, for example, the control signal may be received via the second communication processing module 25.

For example, in a case where the edge device is a lighting fixture, if the communication device 20 includes an actuator which drives the illuminance sensor and LED, inconvenience of the lighting fixture, and the like can be monitored by transmitting the illuminance (sensor data) measured by the illuminance sensor to the IoT, and the lighting fixture (LED) can be remotely dimmed by controlling the actuator based on the control signal transmitted from the IoT server, according to the processing executed by the above-described device processing module 24.

It has been described that the edge device is the lighting fixture and that the sensor/actuator 27 is the actuator which drives the illuminance sensor and the LED (illumination), but the edge device may be any device other than the lighting fixture. In addition, the sensor 27 may be, for example, a temperature sensor, a humidity sensor, a carbon dioxide (CO2) concentration sensor, an image sensor (camera), or the like, and the actuator 27 may be an actuator which drives a speaker, a camera, a robot arm, or the like.

Furthermore, it has been described that the sensor/actuator is included in the communication device 20, but the host controller 10 (edge device) may include a sensor/actuator 17 as shown in FIG. 13. Even in such a configuration, the sensor data measured by the sensor 17 can be transmitted from the communication device 20 to the IoT server, and the actuator (or sensor) 17 can be controlled by the communication device 20 (IoT server). FIG. 13 is a view mainly showing the functional configuration of the host controller 10, and the sensor/actuator 17 corresponds to a part of the hardware configuration of the host controller 10.

Incidentally, when the connection between the host controller 10 and the communication device 20 is permitted as described above, setting information of the communication processing module (for example, the third communication processing module 26 or the like) may be provided from the user terminal 30 to the communication device 20. The setting information includes, for example, identification information (identifier) which is to be set in the third communication processing module 26 to communicate with the above-described IoT server, identification information of the network to which the communication device 20 is connected or the network constituted by the communication device 20, and the like. In addition, when the communication device 20 and the IoT server execute wireless communication, the above-described setting information may include information such as radio frequency and channel for the wireless communication. Such setting information may be provided according to the user operation (input information) to the user terminal 30 or provided by the server device 40.

As described above, the communication system 1 according to the present embodiment includes the host controller 10 provided in the edge device, and the server device 40 connected via the network to the communication device 20 connected to the host controller 10, and the server device 40 receives the unique information of the host controller 10 (first information unique to the host controller 10) and the unique information of the communication device 20 (second information unique to the communication device 20), and determines whether or not the communication device 20 can be connected to the host controller 10, based on the received unique information of the host controller 10 and the communication device 20. The host controller 10 can receive the connection availability information including the determination result in the server device 40 from the server device 40 via the communication device 20, and reject the connection of the communication device 20, based on the received connection availability information.

Incidentally, in the present embodiment, the host controller 10 supplies power to the communication device 20 when the communication device 20 is connected or stops supplying power to the communication device 20 when the connection of the communication device 20 is rejected.

In addition, the process of determining whether or not the communication device 20 can be connected to the host controller 10 in the present embodiment (i.e., the connection availability determination process) is executed, based on the determination information including the conditions (host controller information) of the host controller to which the communication device 20 can be connected in association with the information unique to the communication device 20.

In the present embodiment, the above-described configuration enables central control of the correspondence between the host controller 10 and the communication device 20, in the server device 40, and enables various communication devices 20 to be easily and safely connected to the host controller 10. In other words, in the present embodiment, connecting the only appropriate communication device 20 to the host controller 10 (i.e., operating the host controller 10 in association with the legitimate communication device 20) can be realized.

Incidentally, according to the configuration of the present embodiment, control of limiting (restricting) the communication device 20 that can be connected to the host controller 10 to the products of a specific vendor (model or firmware) can be executed, and the mechanism provided in the present embodiment can be used in a business model. Furthermore, the configuration of the present embodiment is useful as a security measure for the IoT services since a situation of connecting the communication device 20 which a malicious third party has prepared to the host controller 10 for an unauthorized purpose can be avoided.

Furthermore, in the present embodiment, when the communication device 20 is connected to the host controller 10, the pairing process is executed to pair the communication device 20 with the user terminal 30, and the above-described unique information of the host controller 10 and the communication device 20 is transmitted from the communication device 20 to the server device 40 via the user terminal 30 after the pairing is completed. In the present embodiment, this configuration enables central control on the connection between the host controller 10 and the communication device 20 through the user terminal 30 used by the user. In addition, the user terminal 30 in the present embodiment can provide a function of the user interface for urging the host controller 10 to execute the process to determine whether or not the communication device 20 can be connected to the host controller 10, as described above.

In addition, in the present embodiment, the host controller 10 (power supply control module 11) stops supplying power to the communication device 20 when no connection availability information is received (for example, pairing is not completed) before a predetermined period of time (first period) has elapsed. In the present embodiment, unnecessarily supplying power to the communication device 20 (enabling the communication device 20 to operate) in a situation where it is not possible to determine whether or not the communication device 20 can be connected to the host controller 10, can be avoided by this configuration.

Incidentally, the host controller 10 (power supply control module 11) may be configured to resume supplying power to the communication device 20 when a predetermined period of time (second period) has elapsed after power supply to the communication device 20 is stopped due to receiving no connection availability information. According to such a configuration, when the connection availability information is not received (pairing is not completed) due to a temporary deterioration of the communication status or the like, the connection availability information may be received by resuming power supply to the communication device 20.

Furthermore, the present embodiment may be configured to verify the electronic signature attached to the connection availability information transmitted from the server device 40. According to such a configuration, for example, a situation in which the connection of the communication device 20 to the host controller 10 is permitted based on tampered connection availability information, can be avoided, thereby reducing security risks in the IoT services.

Incidentally, when the connection of the communication device 20 is not rejected as described above (i.e., the connection is permitted), the host controller 10 (authentication processing module 15) may issue a token to be used for the communication executed with the communication device 20. The token thus issued is held in the host controller 10 and the communication device 20. According to such a configuration, for example, when the communication device 20 executes data communication with the host controller 10, the host controller 10 can check the token included in the data against the token held inside the host controller 10, and operate to process the data only when the token included in the data is the correct token.

More specifically, it is assumed that, for example, when the host controller 10 includes the sensor 17 as shown in FIG. 13 described above, the communication device 20 reads (i.e., receives from the host controller 10) the sensor data measured by the sensor 17. In this case, for example, the communication device 20 requests the sensor data from the host controller 10 but, if a correct token (token issued by the host controller 10) is not included in the request, the host controller 10 can reject the request (i.e., does not transmit the sensor data in response to the request).

According to this configuration, security risks in the IoT services can be further reduced.

Incidentally, an expiration date (information) may be set for the token issued by the host controller 10. If an expiration date is set on the token in this manner, the token whose expiration date expires cannot be used. Therefore, when continuing the connection (communication) with the host controller 10, the communication device 20 requests the host controller 10 to issue a token for a new expiration date is set within the expiration date.

By the way, it has been described that the communication system 1 executes the processes shown in FIG. 9 in the present embodiment but, in the process shown in FIG. 9, the pairing process is executed between the communication device 20 and the user terminal 30 after the host controller 10 and the communication device 20 are connected via the connection interface.

However, for example, a plurality of lighting fixtures are installed on the ceiling as edge devices and, executing for each edge device a work of operating the user terminal 30 and the communication device 20 (for example, pressing predetermined buttons of the user terminal 30 and the communication device 20) to execute the pairing process, after connecting the communication device 20 to the host controller 10 via a connection interface such as a USB connector or pin slot connector, is very complicated.

For this reason, the present embodiment may adopt a configuration in which, for example, the pairing process between the communication device 20 and the user terminal 30 is executed in advance, and the communication device 20 that has completed the pairing process is connected to the host controller 10.

FIG. 14 is a sequence chart showing an example of a processing procedure of the communication system 1 in a case of executing the pairing process between the communication device 20 and the user terminal 30 in advance.

In this case, for example, a power supply jig including a USB connector having a power supply function is prepared, and the communication device 20 in an initialized state is connected to the power supply jig via the USB connector, and power is supplied to the communication device 20. When power is supplied to the communication device 20, the communication device 20 becomes an operable state, and the pairing process between the communication device 20 and the user terminal 30 can be executed (step S21). Incidentally, since the process in step S21 is the same as the process in step S3 shown in FIG. 9, its detailed description will be omitted here.

After the process in step S21 is executed, the processes in steps S22 to S35 corresponding to the processes in steps S1, S2, and S4 to S15 shown in FIG. 9 may be executed.

In other words, according to the processes shown in FIG. 14, pairing between the communication device 20 and the user terminal 30 has already been completed when the communication device 20 is connected to the host controller 10. Therefore, when the host controller 10 and the communication device 20 are connected and the user terminal 30 receives, for example, a predetermined signal transmitted from the communication device 20 (i.e., confirms that the communication device 20 becomes an operable state), the user terminal 30 can immediately request the communication device 20 for the unique information.

In the configuration in which the pairing process between the communication device 20 and the user terminal 30 is executed in advance as described above, the pairing process in the communication system 1 of the present embodiment can be executed efficiently and the user's convenience can be improved.

In addition, for example, if a power supply jig 200 including a plurality of USB connectors 200a is prepared as shown in FIG. 15, pairing to a plurality of communication devices 20 connected to a plurality of edge devices (host controller 10 mounted on each of the edge devices) can be executed sequentially, and the efficiency of the pairing process can be further improved.

Incidentally, in the present embodiment, it has been described that the host controller 10 including the power supply control module 11 is mounted on the edge device as shown in FIG. 2, but the edge device may be configured such that the power supply board 11a including the power supply control module 11 is prepared separately from the host controller 10 (in other words, the power supply control module 11 is mounted on a board different from that of the host controller 10), as shown in FIG. 16. Even in such a configuration, the power supply control module 11 can supply power to the communication device 20 in response to instructions (control) from the device control module 13. Incidentally, for example, the edge device may have a configuration in which the host controller 10 is incorporated in the power supply board 11*a* or may have other configurations.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication system, comprising:
a controller provided in an edge device; and
a server device connected, via a network, to a communication device connected to the controller, wherein
the server device includes a first processor configured to:
receive first information unique to the controller and second information unique to the communication device; and
determine whether the communication device is connectible to the controller, based on the received first and second information, and
the controller includes a second processor configured to:
receive connection availability information including a result of the determination from the server device via the communication device; and
reject connection of the communication device, based on the received connection availability information.

2. The communication system of claim 1, wherein the second processor is configured to:
supply power to the communication device when the communication device is connected to the controller, and
when rejecting the connection of the communication device, stop supplying power to the communication device.

3. The communication system of claim 2, wherein
when the communication device is connected to the controller, a pairing process of pairing the communication device and a user terminal used by a user is executed, and
the first and second information is transmitted from the communication device to the server device via the user terminal after the pairing is completed.

4. The communication system of claim 3, wherein the second processor is configured to:
receive the connection availability information from the server device via the communication device and the user terminal, and
when the connection availability information is not received before a predetermined first period has elapsed, stop supplying power to the communication device.

5. The communication system of claim 4, wherein the second processor is configured to resume supplying power to the communication device when a predetermined second period has elapsed after power supply to the communication device is stopped due to not receiving the connection availability information.

6. The communication system of claim 1, wherein
an electronic signature generated in the server device is attached to the connection availability information, and
the second processor is configured to verify an electronic signature attached to the received connection availability information.

7. The communication system of claim 1, wherein the second processor is configured to issue a token used for communication with the communication device when not rejecting connection of the communication device.

8. The communication system of claim 1, wherein the server device further includes a storage storing determination information including a condition of a controller capable of connecting the communication device in association with unique information, and
when the first information meets a condition included in the determination information in association with the second information, the first processor is configured to determine that the communication device is connectible to the controller.

9. The communication system of claim 1, wherein the communication device is connected to the controller via a connection interface provided in the edge device.

10. A controller provided in an edge device and connected to a communication device, the controller comprising a processor configured to:
receive connection availability information from a server device connected to the communication device via a network, the connection availability information including a result of determining whether the communication device is connectible to the controller based on first information unique to the controller and second information unique to the communication device; and
reject connection of the communication device, based on the received connection availability information.

11. A server device connected, via a network, to a communication device connected to a controller provided in an edge device, the server device comprising a processor configured to:
receive first information unique to the controller and second information unique to the communication device; and
determine whether the communication device is connectible to the controller, based on the received first and second information, wherein
the controller is configured to reject connection of the communication device, based on the connection availability information including the determination result.

12. A method executed by a communication system comprising a controller provided in an edge device, and a server device connected, via a network, to a communication device connected to the controller, the method comprising:
determining whether the communication device is connectible to the controller, by the server device, based on first information unique to the controller and second information unique to the communication device; and
rejecting connection of the communication device, by the controller, based on the connection availability information including the determination result.

* * * * *